United States Patent [19]

Ostrowiecki

[11] Patent Number: 4,747,129
[45] Date of Patent: May 24, 1988

[54] TELEPHONE RING REGISTERING DEVICE

[76] Inventor: Morris Ostrowiecki, 5-21-11 Jingumae, Sibuya-Ku, Tokyo, Japan

[21] Appl. No.: 30,248

[22] Filed: Mar. 24, 1987

Related U.S. Application Data

[63] Continuation of Ser. No. 734,864, May 16, 1985.

[51] Int. Cl.$^4$ .............................................. H04M 1/65
[52] U.S. Cl. ...................................... 379/199; 379/79; 379/140
[58] Field of Search ................... 379/67, 68, 70, 79, 379/82, 90, 110, 133, 136, 140, 387, 396, 442, 372, 373, 376, 199

[56] References Cited

U.S. PATENT DOCUMENTS 3,943,526  3/1976  Albertini et al. ................... 179/6.16
4,045,619  8/1977  Harrington ....................... 179/7.1 R
4,079,201  3/1978  Scott et al. ....................... 179/7.1 R
4,345,114  8/1982  Sato et al. ........................ 179/6.16
4,500,753  2/1985  Plunkett, Jr. ..................... 179/6.03

OTHER PUBLICATIONS

Radio Shack 1982 Catalog, p. 81, Item Number 63-836.

Primary Examiner—James L. Dwyer

[57] ABSTRACT

A telephone ring time registering device for recording and displaying the times of incoming telephone calls while not answering the telephone calls. Also, the number of times the telephone rings during each incoming call is registered, so that the user may further have some indication of the urgency of each incoming call. Also, an answering machine which records an audio signal representative of the times incoming calls were registered at the beginning of each message is disclosed.

16 Claims, 3 Drawing Sheets

TELEPHONE RING REGISTERING DEVICE

This application is a continuation of application Ser. No. 734,854, filed May 16, 1985.

BACKGROUND OF THE INVENTION

The present invention relates to a registering device and more particularly to a device for indicating visually and/or orally the time that telephone calls where recorded.

Presently available telephone answering machines only allow the operator to hear messages. However, no indication to when the message was recorded is available. Further, many people are very reluctant to leave messages and hang up without leaving one on the answering machine. These people after calling and hanging up without leaving a message eventually stop calling for fear that they will have to hang up on the answering machine again, so that when the master of the machine finally returns home, no more calls come in because people don't know that he is already home and, not wanting to hang up on the machine, refrain from calling again.

SUMMARY OF THE INVENTION

A major object of the present invention is to overcome the drawbacks mentioned above.

Another object of the present invention is to provide a telephone ring time registering device which only visually informs the operator of the time that telephone calls were made during his presence or absence. The device may be either built into the telephone unit itself or in the form of a flat plate which is adhesively attached to the side of the telephone unit.

In another embodiment, the device is incorporated with a telephone answering machine whereby each time the answering machine is activated, the device automatically records the time on the telephone answering machine, whereby the operator of the unit can hear the time each message was recorded before or after the message is played.

BRIEF DESCRIPTION OF THE DRAWINGS

In the Figs, the same reference numerals designate the same or corresponding parts.

DETAILED DESCRIPTION OF THE PREFERRED EMBODIMENTS

Figure 1:
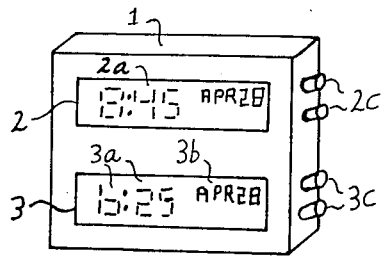
FIG. 1 is a perspective view of the telephone ring time registering device according to the present invention.

FIG. 1 shows a first embodiment of the present invention. Referring to the Fig., numeral 1 designates the device in a perspective view, numeral 2 a first display indicating the present time 2a and date 2b (which is illustrated as 8:45 and April 28, respectively), numeral 3 designates a second display indicating the time 3a and date 3b (which is illustrated as 6:25 and April 28, respectively) that the last call registered in the device was made, numerals 2c designates time setting means for setting the present time and numerals 3c designate display setting means for optionally displaying which call in a plurality of the registered calls stored in a memory is to be displayed on the display 3. For example if only the last 10 calls are stored in a memory, each time one of the buttons 3c is pressed, the next chronologically registered call appears on the display 3. Accordingly, the display 3 automatically displays the last registered incoming call.

Although in the embodiment of FIG. 1, the telephone ring register device is shown as having two separate displays 2 and 3 for individually displaying the present time and the registered calls, respectively, the device may comprise only one display which under normal mode of operation always shows the present time and only upon activation of the display setting means 3c is the information displayed altered from the present time to the registered calls. For example, upon each activation of one of the display activation means 3c, the next chronollogically registered call is displayed from the present time backwards and if after a given time the button 3c is not activated, the present time is automatically re-displayed on the single display.

Another embodiment may have one display for indicating the present time and a plurality of displays for chronologically indicating the time a plurality of incoming calls were registered, wherein, when a new call comes in and all the slots are full, the oldest call is erased, the other calls are moved up one display and the newest (chronologically latest) call is registered.

Figure 2:
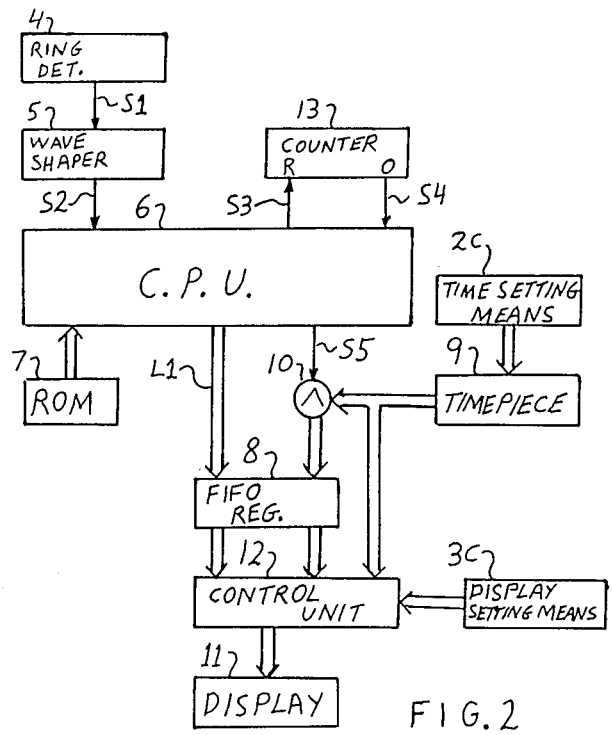
FIG. 2 shows a block diagram of the device according to the present invention.

FIG. 2 shows a schematic block diagram of the device according to the present invention. Referring to the Fig., numeral 4 indicates a telephone ring detector which may be either electrically attached to the telephone buzzer, or may comprise an acoustic coupler and a band pass filter for only passing therethrough signals representative of the ring of a telephone. Numeral 5 designates a wave shaper for shaping the signal from the ring detector 4, numeral 6 designates a central processing unit CPU, numeral 7 designates a read only memory ROM which has stored therein a program shown in FIG. 3, numeral 8 a first in first out FIFO register for storing therein in sequencial chronollogical order a plurality of times which incoming calls were received, 9 a timepiece for indicating the present time and data, 2c time setting means, 3c displaying setting means, 10 an array of AND gates which, when a signal S4 is provided by the CPU allow the present time to be transferred to the FIFO register, 11 a visual display such as a liquid crystal display, and 12 a logic control unit which depending on the order and the number of times the display setting means is activated will determine which of the information stored in the FIFO 8 and/or the timepiece 9 will be displayed on the display 11. Numeral 13 designates a counter the output of which goes high and stays high after time T1.

It should be noted that if the number of displays (i.e. 2,3) are equal to the number of rows in the FIFO register plus one (to indicate the present time and date), then the control unit 12 and the display setting means are not required. Also, that if a separate display is utilized to always display the present time, that the output from the timepiece 9 may connect directly to the display.

Figure 3:
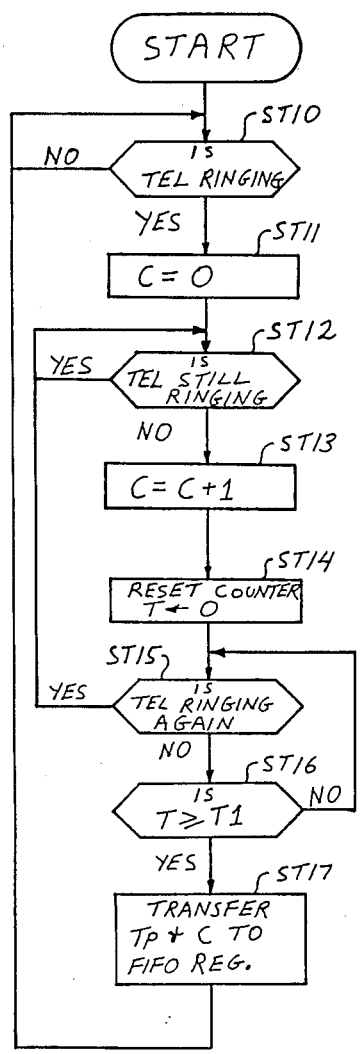
FIG. 3 shows a flow chart stored in a ROM of the device.

Next, the operation of the device will be described in connection with the flow chart shown in FIG. 3 and the waveform diagrams shown in FIG. 4. Referring to the flow chart, after starting such as when a battery is connected, at step ST10, it is determined whether or not the telephone is ringing (by the monitoring of the output S2 of the wave shaper 5). If the answer in NO i.e. the telephone is not ringing, the program keeps executing step ST10. When the telephone does finally ring, the CPU proceeds to step ST11, where a counter C is reset to zero. This counter C is utilized to count the number of rings that the telephone rings before the caller hangs up or the user picks up the telephone. This information may further be displayed in addition to the respective times that the incomming calls were made, thereby indicating to the user how persistently each registered call was made while he was out. This information stored in counter C is transferred from the CPU to the FIFO via line L1. Next, at step ST12, it is determined whether or not the telephone is still ringing. If the answer is YES, the CPU continues to execute step ST12. When the output S3 goes low indicating that the telephone has stoped ringing, the program proceeds to step ST13 where the value stored in the counter C is increased by 1. Next at step ST14, the CPU resets the counter 13 (i.e. the CPU issues a signal S3 which causes the counter 13 to reset and start counting again), which causes the output S4 to go low. Next, at step ST15, it is determined wheter or not the telephone is ringing again by monitoring the output S2. If the telephone is not ringing (i.e. S2=0), the CPU proceeds to step ST16 where it is determined whether or not time T=T1 (i.e. is S4=1). If the answer at step ST16 is NO, the CPU returns to execute step ST15 where again it is determined whether or not the telephone is ringing. Steps ST15 and ST16 are repeatedly executed till either the telephone rings or till time T1 arises (i.e. output S4 goes high). If the telephone rings again before the time T1 arises, the program returns to step ST12 where, the same procedure previously explained occurs. However, if the telephone does not ring again by the time T1 (i.e. the time that signal S4 goes high), the program proceeds to step ST17 were the CPU issues a command S5 whereby the AND gate 10 is enabled allowing the present time to be transfered to a first row in the FIFO register, as well as transferring the contents of the counter C to the FIFO register. After executing the step ST17, the CPU returns to executing the step ST10.

Accordingly, when an incoming call occurs, the CPU executes steps ST10–ST16 for the first telephone ring S1, and steps ST12–ST16 for each consecutive ring, and when no rings are detected for a period of time T>T1, the CPU proceeds to step ST17 and back to step ST10.

Figure 4:
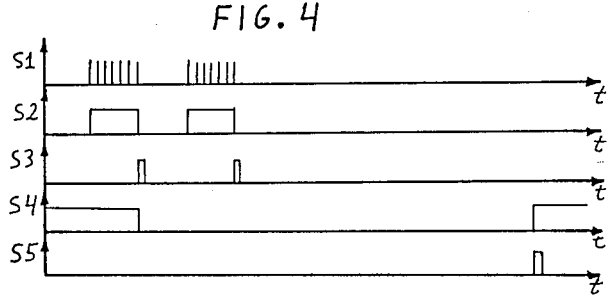
FIG. 4 shows wave form diagrams of signals generated in the device.

In FIG. 4, the telephone is indicated as ringing only twice.

Figure 5:
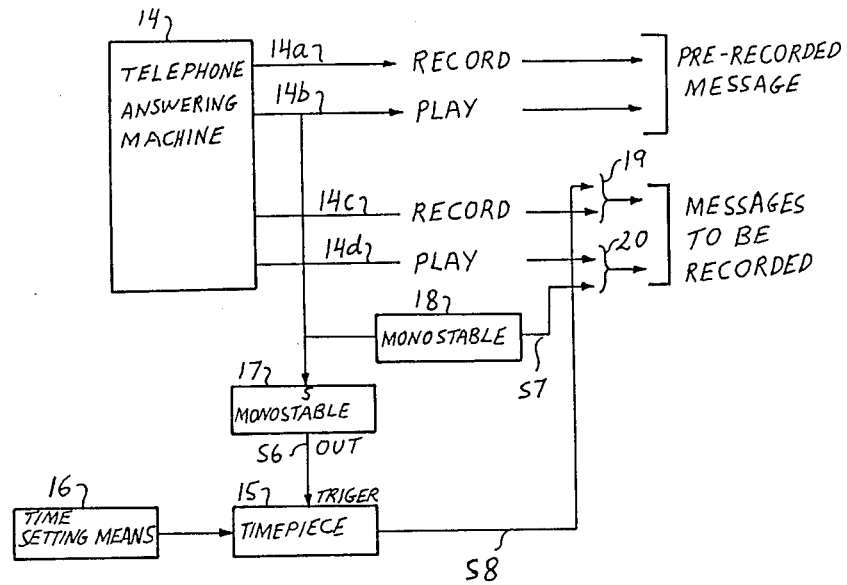
FIG. 5 shows a schematic block diagram of an audio time recording device for a telephone answering machine.

FIG. 5 shows a further embodiment according to the present invention. Referring to the Fig., numeral 14 designates a conventional telephone answering machine having output lines RECORD 14a and PLAY MODE 14b which connect to a recording head and to a play mode (i.e. driving motor signal), respectively, utilized for the pre-recorded messages magnetic tape storage means control, as well as output lines RECORD 14c and PLAY MODE 14d which connect to a recording head and to a play mode (i.e. driving motor signal), respectively, utilized for the messages to be recorded magnetic tape storage means control. Numeral 15 designates a time piece which is capable of generating audio signals representative of the present time, numeral 16 time setting means, numerals 17 and 18 monostables, and 19 and 20 OR gates.

Figure 6:
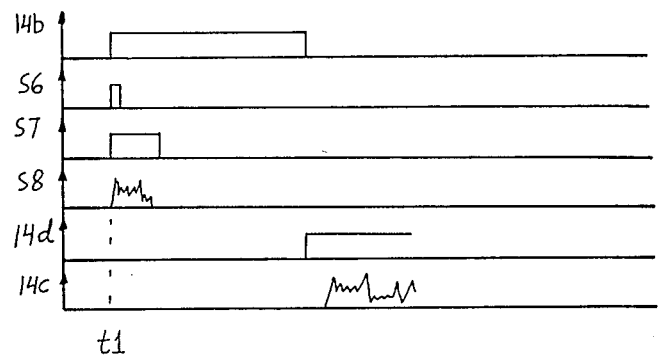
FIG. 6 is a waveform diagram showing signals at different points of the device of FIG. 5.

In operation, when a telephone call is detected by the telephone answering machine 14, the machine is activated and the signal on line 14b goes high causing a first drive motor to turn which causes a pre-recorded message to be played. As can be seen from the waveform diagrams of FIG. 6, the first and second monostables 17 and 18 are trigered at the time the pre-recorded message starts playing, which causes the outputs S6 and S7 of the monostables to go high. Accordingly, the signal S7 causes the play signal of the messages to be recorded to go high causing the drive motor thereof to turn while the signal S6 causes the timepiece 15 to be activated which intern generates an electrical signal S8 which is recorded on the messages to be recorded tape, the electrical signal being an analog signal representative of the present time. The timepiece 15 is a conventional audio timepiece which is well known in the art. After the pre-recorded message is played, the signal 14d goes high which causes again the dive motor of the messages to be recorded tape to turn on again which allows the caller to record a message. In this way a signal representative of the present time can be recorded before each message, thereby giving the user an immidiate indication of the time that each message was recorded. Since the pre-recorded message is generally longer then a few seconds and since the time required to record the present time is about one second, this embodiment provides a practicle way of recording the time that each message is entered.

Figure 7:
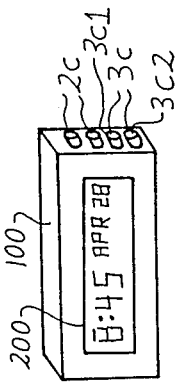
FIG. 7 shows a perspective view of a second embodiment of a telephone ring time registering device according to the present invention.

FIG. 7 shows a perspective view of a second embodiment of the telephone ring time registering device 100 according to the present invention. Referring to the Fig., the device 100 comprises only the one display 200 for alternatively displaying both the present time and any of a plurality of times and respective dates that incoming calls were registered which are stored in a FIFO register.

Figure 11:
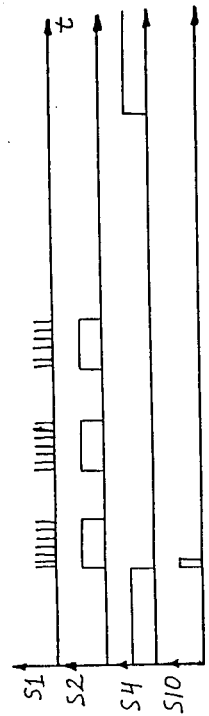
FIG. 11 shows a frame flow chart showing one way in which a display control unit 120 or 12 may be programmed.
Figure 8:
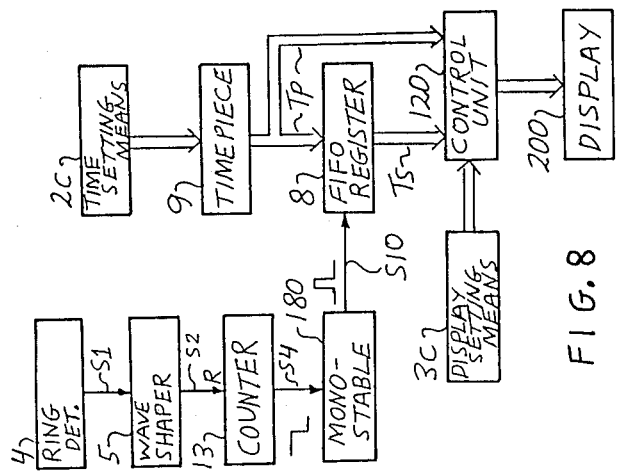
FIG. 8 shows a block diagram of a second embodiment of a ring time registering device according to the present invention.

FIG. 8 shows a block diagram of a second embodiment of the ring time registering device according to the present invention. Referring to the Fig., numeral 180 designates a monostable, numeral 120 a control unit similar to the control unit 12 in FIG. 2, the numeral 200 a liquid crystal display. The remaining portions are the same as those shown in FIG. 2. The operation of the ring time registering device will be described herebelow. As can be seen from the waveform diagrams of FIG. 11, the counter 13 is reset every time the output of the ring detector goes high. The counter output is designed to stay low for a period of time greater then the time between telephone rings. Once the counter counts to a given count, its output goes high and stays high. Accordingly, if the telephone keeps ringing, the counter 13 is continually reset preventing the output thereof from going high. The output of the counter 13 going low trigers a negative edge monostable 180, which causes a short pulse S10 to appear on the output thereof. This pulse acts as a clock signal for the FIFO register 8.

Figure 9:
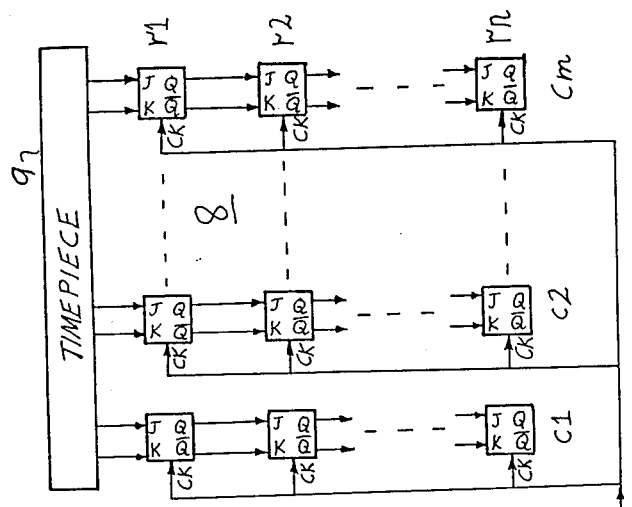
FIG. 9 shows a schematic block diagram of a FIFO register 8 shown in FIGS. 2 and 8 according to the present invention.

FIG. 9 shows one construction of a FIFO register 8 according to the present invention. The register 8 comprises J-K flip flops (herein after referred to as F/F) arranged in rows r1–rn, each row having m F/F. Accordingly, the time and date of the last n incoming calls can be stored in the register 8. The output of the monostable 10 connects to the clock input of the F/F. Accordingly, when the pulse S10 is generated, the information stored in row r1 is transferred to row r2, the information in row r2 is transferred to row r3 and so on, and the information in row rn is erased.

It should be noted that tne number of F/F in each row m represents the minimum number of F/F required to store in binary code the information representative of the respective time and date that each incoming call was registered.

Figure 10:
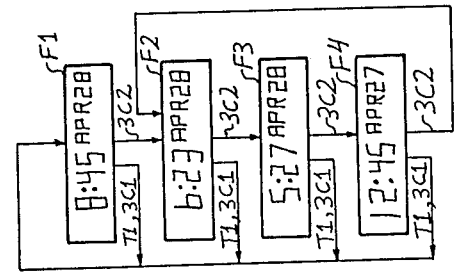
FIG. 10 shows a displayed frame diagram showing the information displayed as a function of the bottom 3c activated.

FIG. 10 shows a frame flow chart of the information displayed as a function of the order in which the display setting means 3c are activated. This flow chart is only one way in which the control unit 120 may be programed to display information, and is not intended to limit the invention thereto. Refering to the Fig., Frame F1 shows the time frame showing the present time and date (namely, 8:45 AM April 28). Frames F2-F4 show registered incoming call time frames of calls which have been registered up to the present time. It should be noted that in this flow chart it is assumed that only 3 calls can be stored in the register 8 (i.e. n=3). However, it is not intended to limit the number to 3 and any number of call times may be stored. As can be seen from the flow chart, each time the button 3c2 is pressed, the displayed frame changes from a frame showing the present time F1, to call time frames F2, F3, F4, F2, and so on, wherein the frame F2 shows the time and date of the latest incoming call, frame F3 the time and date of the second latest incoming call and the frame F4 the third latest incoming call. In this way, the operator can quicky see in a reverse chronological order the times that calls came in from the present time. Pressing the button 3c1 while either of the frames F2, F3 or F4 is being displayed, causes the frame F1 to be displayed. If the displayed frame is F2, F3 or F4 and the button 3c1 and/or 3c2 is or are not pressed for a time T1 (i.e. 10 seconds), the displayed frame automatically changes to the frame F1.

Although a specific way is shown in FIG. 10 in which the control unit 120 is made to display the present time Tp or registered call times Ts stored in the register 8, the present invention is not to be limited thereto and any number of sequences or push buttons may be used to selectively display the information.

What is claimed is:

1. A telephone time ring registering device which does not answer incoming calls and which comprises:
   means for detecting that a telephone is ringing;
   timekeeping means for determining the present time;
   storage means for storing information representative of the time that incoming calls were made in responce to the ringing detecting means; and
   means for displaying the present time and the time that incoming calls were made.

2. A time recording device for a telephone answering machine according to claim 1 wherein said displaying means comprises:
   means for transfering the present time from said timekeeping means to said storage means at the time said ring detecting means detects an incoming call.

3. A telephone time ring registering device according to claim 1, further comprising:
   activation means for selectively choosing which time in said times is displayed on said display means, the time being displayed on said display means changing immediately from one time to another time in said times with respect to the time said activation means is activated, and the time being displayed on said display means changing from one time to another time in said times in response to each time said activation means is activated.

4. A telephone time ring registering device according to claim 3, wherein:
   said display means displays only one time in said times at any given time, the displayed time being determined by the activation state of said activation means.

5. A telephone time ring registering device according to claim 3, further comprising:
   means for displaying in reverse chronological order the times of incoming telephone calls registered in said memory means as a function of the activation state of said activation means, so that the user may see displayed on said display means the times that the last call was registered, the time that the next to the last call was registered, and so on, each time said activation means is activated.

6. A telephone time ring registering device according to claim 3, further comprising:
   means for automatically causing the display means to display the present time whenever said activation means has not been activated for a predetermined period of time.

7. A telephone time ring registering device according to claim 3, wherein said memory means comprises a FIFO register, whereby the oldest information stored in the memory representing the chronologically oldest telephone call time is automatically erased when said memory is full and information representative of a new call time is registered in said memory.

8. A telephone time ring registering device according to claim 3, wherein said ring detecting device comprises a audio detecting device.

9. A telephone time ring registering device according to claim 3, wherein said display means comprises a liquid crystal display.

10. A telephone time ring registering device according to claim 3, further comprising:
    means for determining the number of times the telephone rings for each incoming call;
    means for storing information representative of the number of times the telephone rings for each incoming call; and
    means for displaying the number of times the telephone rang for each incoming call,
    the information representative of the number of times the telephone rang during a given call being displayed in combination with the respective time said given call was registered on said display means.

11. A telephone time ring registering device according to claim 3, further comprising:
    means for generating the present date;

means for storing information representative of the date during which each incoming call was registered;

means for displaying the date of the incoming call, the information representative of the date during which each incoming call was made being displayed in combination with the respective time said given call was registered on said display means.

12. A telephone time ring registering device according to claim 10, wherein the times of incoming calls are displayed on the same display portions utilized for displaying the hour and minutes portion of the present time, and the number of times the telephone rang is displayed on the same portions as the portions on which the second portion of the present time are displayed.

13. A telepone time ring registering device according to claim 3, wherein said device has an adhesive back portion for physically mounting the device on a telephone unit.

14. A time recording device for a telpehone answering machine which comprises:

means for generating signals representative of the present time;

means for detecting that the answering machine has been activated into the playing mode of a pre-recorded message;

means for activating the record mode of operation of a messages to be recorded magnetic tape storage means for a predetermined period of time when said detecting means detects that the answering machine has been activated into the playing mode of a pre-recorded message;

means for recording an audio signal represenative of the present time on the messages to be recorded magnetic tape during said predetermined period of time, so that the time each incoming call occured may be indicated at the begining of each respective message.

15. A time recording device according to claim 14, wherein said detecting means comprises:

the output signal of the PLAY mode of the pre-recorded messages drive unit.

16. A time recording device according to claim 14, wherein said activating means comprises:

a first monostable the set input of which is connected to the output of a PLAY mode of a pre-recorded messages drive unit, and the output of which is connected to the PLAY mode of a messages to be recorded drive unit.

* * * * *